US012036809B2

(12) United States Patent
Kishi et al.

(10) Patent No.: US 12,036,809 B2
(45) Date of Patent: Jul. 16, 2024

(54) ELECTRIC STAPLER AND SHEET PROCESSING APPARATUS

(71) Applicant: MAX CO., LTD., Tokyo (JP)

(72) Inventors: Kazuhiko Kishi, Tokyo (JP); Toshiya Ishida, Tokyo (JP)

(73) Assignee: Max Co., Ltd., Tokyo (JP)

( * ) Notice: Subject to any disclaimer, the term of this patent is extended or adjusted under 35 U.S.C. 154(b) by 161 days.

(21) Appl. No.: 17/721,199

(22) Filed: Apr. 14, 2022

(65) Prior Publication Data

US 2022/0332138 A1 Oct. 20, 2022

(30) Foreign Application Priority Data

Apr. 15, 2021 (JP) ................................ 2021-069382

(51) Int. Cl.
*B65H 37/04* (2006.01)
*B27F 7/19* (2006.01)
*B27F 7/36* (2006.01)
*B42C 1/12* (2006.01)

(52) U.S. Cl.
CPC .................. *B42C 1/12* (2013.01); *B27F 7/19* (2013.01); *B27F 7/36* (2013.01)

(58) Field of Classification Search
CPC .......... G03G 2215/00822; G03G 2215/00827; B41L 43/12; B31F 5/001; B41F 13/66; B65H 37/04; B65H 2408/12; B27F 7/19; B27F 7/36
USPC ........................................... 270/58.08, 58.09
See application file for complete search history.

(56) References Cited

U.S. PATENT DOCUMENTS

| | | | | | |
|---|---|---|---|---|---|
| 6,145,825 | A * | 11/2000 | Kunihiro | B42C 1/12 | 271/181 |
| 7,178,799 | B2 * | 2/2007 | Wakabayashi | B65H 37/04 | 270/37 |
| 9,067,337 | B2 * | 6/2015 | Nagasaki | G03G 15/6544 | |
| 10,082,759 | B2 * | 9/2018 | Kitamura | B65H 37/04 | |
| 10,577,215 | B2 * | 3/2020 | Shimizu | B27F 7/006 | |
| 11,325,805 | B2 * | 5/2022 | Takahashi | B41L 43/12 | |
| 11,745,382 | B2 * | 9/2023 | Takahashi | B27F 7/19 | 227/131 |
| 2010/0288814 | A1 | 11/2010 | Higuchi et al. | | |
| 2021/0069881 | A1 * | 3/2021 | Chigira | B27F 7/36 | |

FOREIGN PATENT DOCUMENTS

| | | |
|---|---|---|
| EP | 3789167 A1 | 3/2021 |
| JP | 2010-264557 A | 11/2010 |

OTHER PUBLICATIONS

Extended European Search Report dated Sep. 8, 2022, issued by the European Patent Office in the corresponding European Patent Application No. 22168454.1. (8 pages).

* cited by examiner

*Primary Examiner* — Leslie A Nicholson, III
(74) *Attorney, Agent, or Firm* — Banner & Witcoff, Ltd.

(57) ABSTRACT

An electric stapler includes a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, a motor configured to drive the binding unit, and a controller configured to control the motor. The controller is configured to control the motor to execute the clamping on the sheet bundle or the pressing on the leg portions multiple times in the clamping process.

11 Claims, 13 Drawing Sheets

ELECTRIC STAPLER AND SHEET PROCESSING APPARATUS

CROSS-REFERENCE TO RELATED APPLICATIONS

The present application claims priority from Japanese Patent Application No. 2021-069382 filed on Apr. 15, 2021, the entire content of which is incorporated herein by reference.

TECHNICAL FIELD

The present disclosure relates to an electric stapler and a sheet processing apparatus.

BACKGROUND ART

In the related art, known is an electric stapler configured to automatically perform binding processing by striking a staple into a sheet bundle with a driver mechanism and bending leg portions of the staple penetrating through the sheet bundle with a clincher part. The electric stapler may be used as a desktop type, or may be mounted in an image forming apparatus configured to print an image on a sheet or in a post-processing apparatus configured to execute post-processing.

For example, PTL 1 discloses an electric stapler configured to implement binding processing on a sheet bundle by executing a table advancing step, a staple separating step, a penetration step, a clinching step, and a table retreating step in accordance with a rotating state of a motor.

CITATION LIST

Patent Literature

PTL 1: JP-A-2010-264557

SUMMARY OF INVENTION

As a desired function for the electric stapler, there is a function of putting a binding appearance in order at a time when a predetermined number of sheets (hereinafter, also referred to as 'sheet bundle') are bound (the bound sheet bundle may also be referred to as 'booklet'). The description 'binding appearance is put in order' means that end faces of sheets are aligned without misalignment after binding, corner portions or edges of sheets are not bent (reversely folded), a thickness of a staple portion of the booklet is small, and the like.

A case where end faces of the sheets are misaligned or corner portions or edges of sheets are bent after binding the sheet bundle is described.

When printing characters and the like on a sheet in an image forming apparatus, a curved drum is used to perform printing processing and fixing processing on the sheet. At this time, the sheet may be deformed and curled by a shape of the drum and a heat during the printing or fixing. When a curled sheet is inserted into a binding unit of an electric stapler, as shown in FIG. 11, a curled portion of the sheet collides with an insertion opening and the insertion opening is blocked, so that a next sheet may not be inserted into a correct position. If the binding processing is performed in such a state, end faces of the booklet are misaligned without being aligned. In addition, if the curled sheet is bound, as it is, the sheet may be bound while a corner portion or edge of the sheet is bent.

The problems that occur when the staple portion of the booklet becomes thick are as follows.

The staple portion of the booklet is thicker than the other portions. If the staple portion is thick, the staple portion becomes bulky, curved, and further thicker when a plurality of booklets are stacked. For this reason, as shown in FIG. 12, when a plurality of booklets are stacked for storing, accommodation or the like, the staple portion becomes thicker, so that storage and accommodation spaces are taken up and stable stacking cannot be made.

Therefore, the present disclosure provides an electric stapler and a sheet processing apparatus capable of putting a binding appearance of a sheet bundle in order by suppressing misalignment of end faces of a booklet and bending of corner portions and the like and by reducing a thickness of a staple portion of the booklet.

According to an aspect of the present invention, there is provided an electric stapler including a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, a motor configured to drive the binding unit, and a control unit (controller) configured to control the motor. The control unit is configured to control the motor to execute the clamping on the sheet bundle or multiple times in the clamping process. With this feature, even when the inserted sheet is curled, the curl can be corrected and the sheet can be made flatter by clamping the sheet multiple times. Since the sheet bundle is bound after the curl is corrected, it is possible to suppress misalignment of end faces of a booklet and bending of corner portions, and to put a binding appearance in order.

According to another aspect of the present invention, there is provided an electric stapler including a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, a motor configured to drive the binding unit, and a control unit (controller) configured to control the motor. The control unit is configured to control the motor to execute the pressing on the leg portions multiple times in the clinching process. By pressing the leg portions multiple times, the staple portion of the booklet becomes flatter and a thickness of the staple portion can be reduced (the binding appearance can be put in order).

According to another aspect of the present invention, there is provided a sheet processing apparatus capable of being equipped with an electric stapler including a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, and a motor configured to drive the binding unit. The sheet processing apparatus includes a control unit (controller) configured to control the motor when the electric stapler is equipped. The control unit is configured to control the motor to execute the clamping on the sheet bundle multiple times in the clamping process. With this feature, even when the inserted sheet is curled, the curl can be corrected and the sheet can be made flatter by clamping the sheet multiple times. Since the sheet bundle is bound after the curl is corrected, it is possible to suppress misalignment of end faces of a booklet and bending of corner portions, and to put a binding appearance in order.

According to another aspect of the present invention, there is provided a sheet processing apparatus capable of being equipped with an electric stapler including a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, and a motor configured to drive the binding unit. The sheet processing apparatus includes a control unit (controller) configured to control the motor when the electric stapler is equipped. The control unit is configured to control the motor to execute the pressing on the leg portions multiple times in the clinching process. By pressing the leg portions multiple times, the staple portion of the booklet becomes flatter and a thickness of the staple portion can be reduced (the binding appearance can be put in order).

As described above, according to the first electric stapler, the second electric stapler, the first sheet processing apparatus, and the second sheet processing apparatus of the present disclosure, it is possible to suppress misalignment of the end faces of the booklet and bending of corner portions, and to reduce the thickness of the staple portion of the booklet, so that the binding appearance after binding the sheet bundle can be put in order.

DESCRIPTION OF EMBODIMENTS

Hereinafter, favorable embodiments of the present disclosure will be described in detail with reference to the accompanying drawings.

First Embodiment

[Configuration Example of Electric Stapler 100A]

Figure 1A:
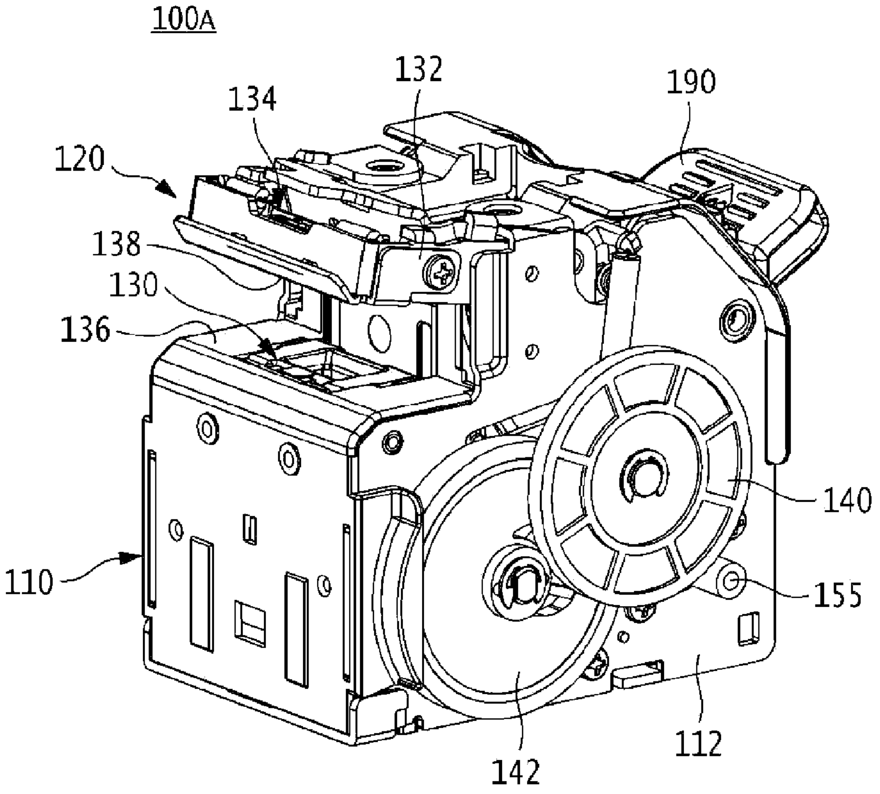
FIG. 1A is a front perspective view of an electric stapler according to a first embodiment.
Figure 1B:
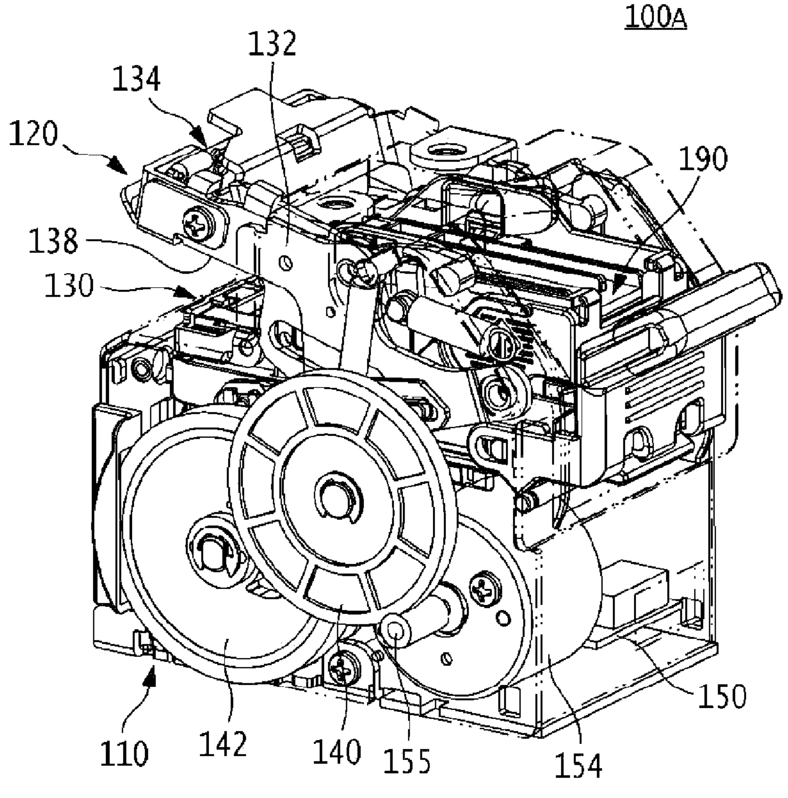
FIG. 1B is a rear perspective view of an inside of the electric stapler according to the first embodiment.

FIG. 1A is a front perspective view of an electric stapler 100A according to a first embodiment, and FIG. 1B is a rear perspective view of an inside of the electric stapler 100A according to the first embodiment. Note that, in FIGS. 1A and 1B, a side on which a driver mechanism 130 is arranged is referred to as a front side of the electric stapler 100A, and an opposite side is referred to as a rear side of the electric stapler 100A. In addition, a side on which gears 140 and 142 are provided is referred to as a left side of the electric stapler 100A, and an opposite side is referred to as a right side of the electric stapler 100A. Further, a side (a bottom wall-side of a main body 110) on which a drive motor 154 is arranged is referred to as a lower side of the electric stapler 100A, and an opposite side is referred to as an upper side of the electric stapler 100A.

The electric stapler 100A is mounted in, for example, an image forming apparatus or a sheet processing apparatus functioning as a post-processing apparatus connected to a downstream side of the image forming apparatus, and is configured to execute binding processing on a sheet bundle consisting of a plurality of sheets on which predetermined images are formed by the sheet processing apparatus. As shown in FIGS. 1A and 1B, the electric stapler 100A has a binding unit 120 configured to perform binding processing on a sheet bundle by sequentially executing a clamping process of clamping (pinching) the sheet bundle, a penetration process of penetrating a staple through the clamped sheet bundle, and a clinching process of pressing leg portions of the staple penetrating through the sheet bundle, a drive motor 154 configured to drive the binding unit 120, and a control unit (controller) 150 configured to control the drive motor 154.

The binding unit 120 has a driver mechanism 130 configured to strike out a staple toward a sheet bundle, a clincher arm 132 provided to be rotatable with respect to the driver mechanism 130, and a clincher part 134 attached to the clincher arm 132 and configured to bend leg portions of the staple struck out by the driver mechanism 130 and penetrating through a sheet. A placement table 136 on which a sheet is placed is provided above the driver mechanism 130 and at a position facing the clincher part 134.

The driver mechanism 130 is arranged inside the front side of the main body 110, and is configured to be movable up and down with respect to the placement table 136, based on drive of the drive motor 154. That is, the driver mechanism 130 is configured to be movable toward the placement table 136 to strike out the staple toward the sheet bundle. The driver mechanism 130 is configured to bend both ends of a staple by a forming plate (not shown) to form the staple into a substantial U-shape, and to strike out the staple formed into the U-shape toward a sheet bundle by a driver (not shown).

The clincher arm 132 is arranged to face an upper side of the driver mechanism 130. The clincher arm 132 is provided to be rotatable with a rear end-side as a fulcrum, and is configured so that a front end-side thereof can move toward and away from the driver mechanism 130. The clincher part 134 is provided at a front end portion of the clincher arm 132, and is configured to bind the sheet bundle with the staple by pressing to inwardly bend the leg portions of the staple penetrating through the sheet bundle, in cooperation with the driver mechanism 130.

A part on a surface-side including the clincher arm 132 and the clincher part 134 and facing the placement table 136 functions as a clamp part 138 configured to clamp the sheet bundle with the placement table 136 and to correct curl of the sheet placed on the placement table 136. The clamp part 138 is configured to be movable between a first position where the sheet bundle is clamped and a second position where the sheet bundle is not clamped.

A cartridge 190 is detachably attached to the main body 110. A refill in which sheet-shaped connecting staples are stacked is accommodated in the cartridge 190. The connecting staples in the refill are conveyed to a forming position by a delivery mechanism (not shown) of the driver mechanism 130.

The control unit 150 and the drive motor 154 are arranged inside a rear side of the main body 110 and below the cartridge 190. Gears 140 and 142 configured to rotate in conjunction with drive of the drive motor 154 are attached to a left sidewall 112 of the main body 110. A rotary shaft 155 of the drive motor 154 and the gear 142 mesh with the gear 140, respectively. A swing arm (not shown) is directly or indirectly connected between the gear 142 and the binding unit 120 including the driver mechanism 130, the clincher part 134 and the like, and the driver mechanism 130, the clincher part 134 and the like are configured to drive in conjunction with rotation of the gear 142 and the like.

In the present embodiment, while the gear 142 and the like make one rotation (360° rotation), a clamping process where the clincher part 134 moves downward to clamp the sheet bundle between the clamp part 138 and the placement table 136, a penetration process where the driver mechanism 130 moves upward to penetrate the leg portions of the staple through the sheet bundle, a clinching process of bending the leg portions of the staple penetrating through the sheet bundle by the clincher part 134, and a return process where the clincher part 134, the driver mechanism 130 and the like return to home positions are executed in corresponding order.

[Block Diagram of Sheet Processing Apparatus 200A]

Figure 2:
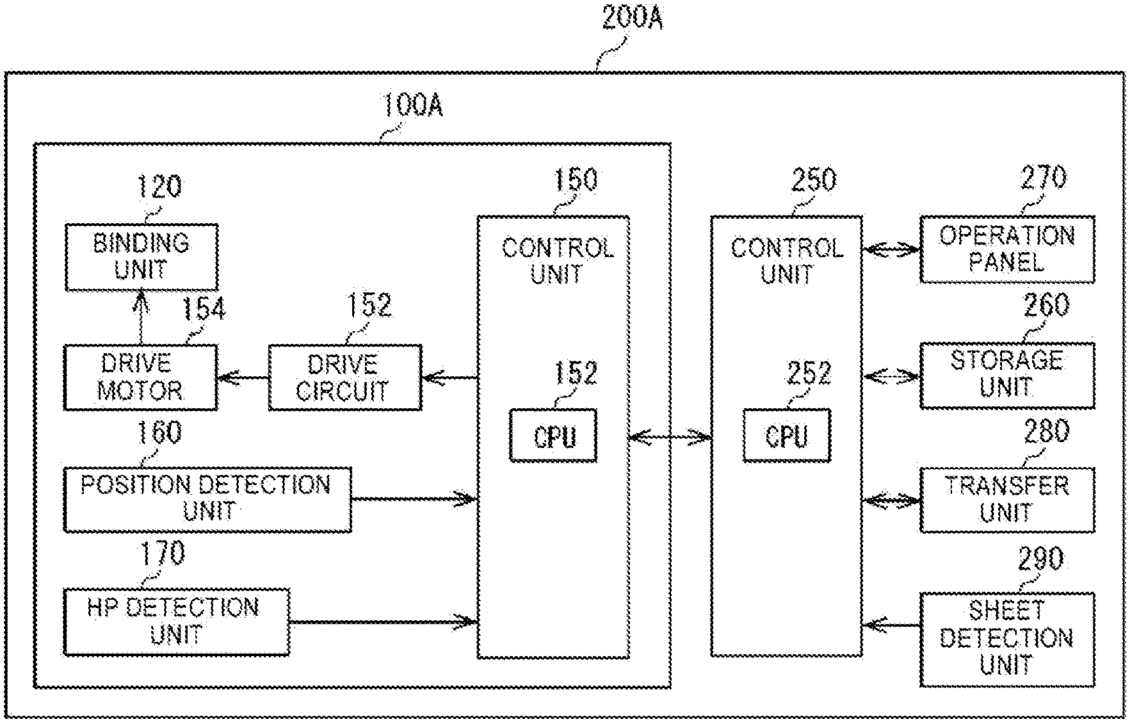
FIG. 2 is a block diagram of a sheet processing apparatus equipped with the electric stapler according to the first embodiment.

FIG. 2 is a block diagram of a sheet processing apparatus 200A equipped with the electric stapler 100A according to the first embodiment.

As shown in FIG. 2, the sheet processing apparatus 200A is equipped with the electric stapler 100A, and has a control unit (controller) 250 configured to control an operation of the entire apparatus, an operation panel 270 for inputting various parameters such as an image forming condition and a binding processing condition, a storage unit 260 configured to store the various parameters input by the operation panel 270, a transfer unit 280 configured to form a predetermined image on a sheet, and a sheet detection unit 290.

First, the electric stapler 100A is described. The electric stapler 100A includes a control unit 150, a drive circuit 152, a drive motor 154, a position detection unit 160, and an HP detection unit 170.

The control unit 150 has a CPU (Central Processing Unit) 152 configured to execute predetermined binding processing by executing various programs. The control unit 150 is connected to the control unit 250 on the sheet processing device 200A-side via a wired or wireless interface, and is configured to execute binding processing including a first control mode, a second control mode, a control mode for performing normal binding processing, and the like, based on a control signal relating to the binding processing supplied from the control unit 250. Here, the first control mode is a mode in which the clamping process is executed multiple times in the binding processing. The second control mode is a mode in which the clinching process is executed multiple times in the binding processing. Further, the control unit 150 is configured to generate a drive signal, based on a position signal from the position detection unit 160 of the drive motor 154, a set command value, and the like, to supply the drive signal to the drive circuit 152, and to adjust a duty ratio of a PWM (Pulse Width Modulation) signal in the drive circuit 152.

The drive circuit 152 is configured to perform on/off control (PWM control) of a switching element, based on the drive signal supplied from the control unit 150, and to adjust power supplied from a power supply unit (not shown), thereby controlling a rotating speed of the drive motor 154. For the switching element, for example, a MOSFET (field effect transistor) or the like can be used. Note that, the drive circuit 152 may be configured to be built in the drive motor 154.

The drive motor 154 is constituted by, for example, a brushless motor, and is configured to rotate at a predetermined speed, based on the power supplied from the drive circuit 152. The binding unit 120 is configured to execute binding processing on a sheet bundle by sequentially executing the clamping process, the penetration process, the clinching process, and the return process by rotary drive of the drive motor 154.

The position detection unit 160 is configured to detect, for example, a magnet polarity of a rotor constituting the drive motor 154, and to output pulsed encoder signals (rotation information of the drive motor 154) indicating positions of the gear 142 and the drive motor 154 to the control unit 150.

The HP detection unit 170 is configured to detect a rotational position indicating a home position of the gear 142 and to output a detection signal to the control unit 150.

The sheet detection unit 290 is constituted by, for example, a reflective or transmissive photo sensor, and is configured to detect a sheet conveyed from the transfer unit 280 to the placement table 136 of the electric stapler 100A, and to output a detection signal to the control unit 150. The sheet detection unit 290 is provided on a conveying path provided between the transfer unit 280 of the sheet processing apparatus 200A and the electric stapler 100A, and is configured to output a sheet detection result to the control unit 150 via the control unit 250 or to directly output the same to the control unit 150.

Subsequently, the sheet processing apparatus 200A-side is described. The control unit 250 of the sheet processing apparatus 200A has a CPU (Central Processing Unit) 252 configured to execute predetermined image forming processing by executing various programs. The control unit 250 is connected to the control unit 150 of the electric stapler 100A, and is configured to output a control signal based on parameter information on binding processing and the like input by the operation panel 270 to the control unit 150.

The operation panel 270 has, for example, a display having a touch panel function and a plurality of operation keys. The operation panel 270 is configured to receive input information on various parameters such as enable or disable of the first control mode and the second control mode regarding the binding processing, the number of sheets to be clamped and the number of times to clamp (the specified number of clamping times) in the first control mode, and the number of times to press leg portions of a staple (the specified number of clinching times) in the second control mode, and to output the same to the control unit 250. Note that, the operation panel 270 includes devices such as a personal computer and a mobile information terminal connected to the sheet processing apparatus 200A via a wired or wireless network.

The storage unit 260 is constituted by, for example, a semiconductor memory element or a storage device such as a hard disk, a solid state drive or an optical disk, and is configured to store parameter information on image forming conditions and binding conditions input by the operation panel 270 or the like. In addition, the storage unit may also be configured to store programs for implementing predetermined functions of the control unit 150 and each constitutional unit.

The transfer unit 280 is an electrophotographic type, an inkjet type, or a dot impact type, and is configured to form a predetermined image on a sheet, and to supply the sheet on which the image is formed to the electric stapler 100A.

[Sequence Example of First Control Mode]

Figure 3:
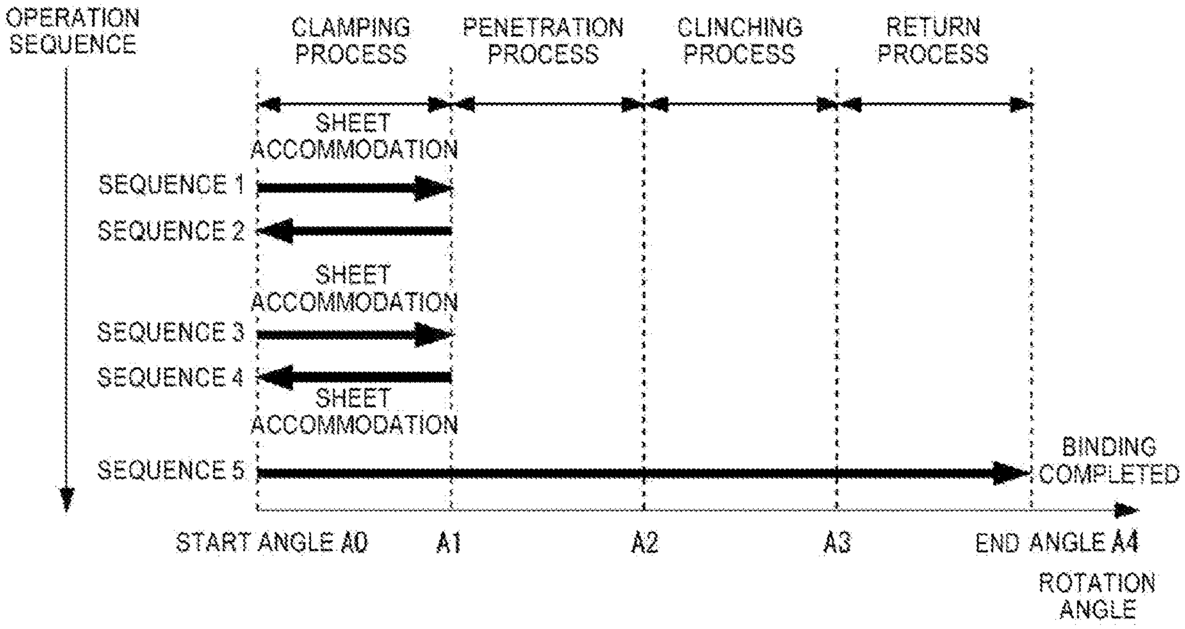
FIG. 3 is a sequence diagram of a first control mode according to the first embodiment.
Figure 4A:
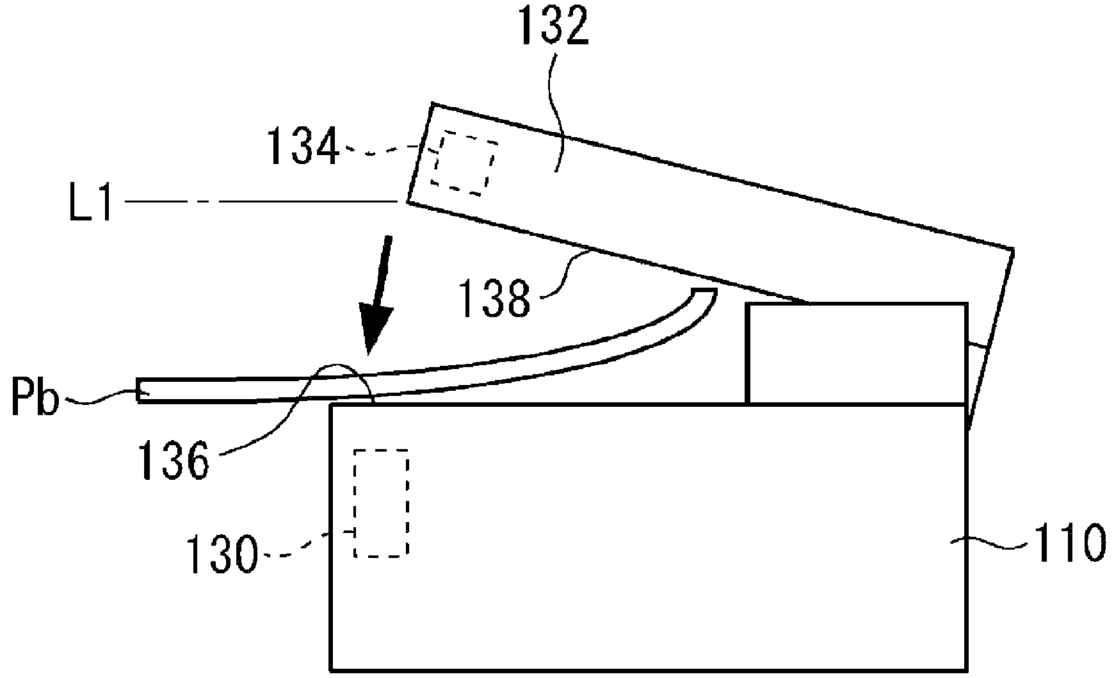
FIG. 4A is a schematic view showing an operation of the electric stapler in executing the first control mode according to the first embodiment.
Figure 4B:
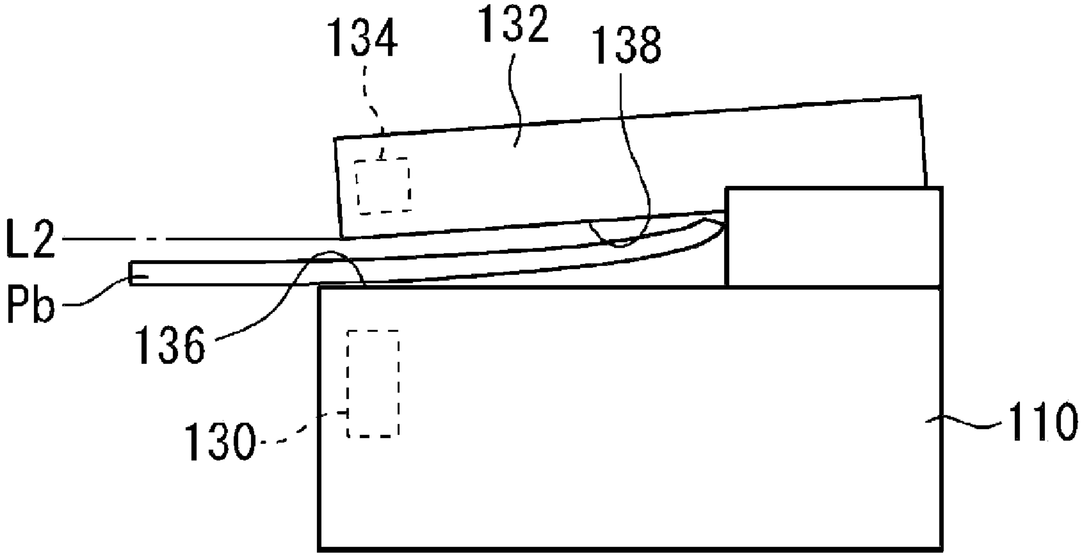
FIG. 4B is a schematic view showing the operation of the electric stapler in executing the first control mode according to the first embodiment.
Figure 4C:
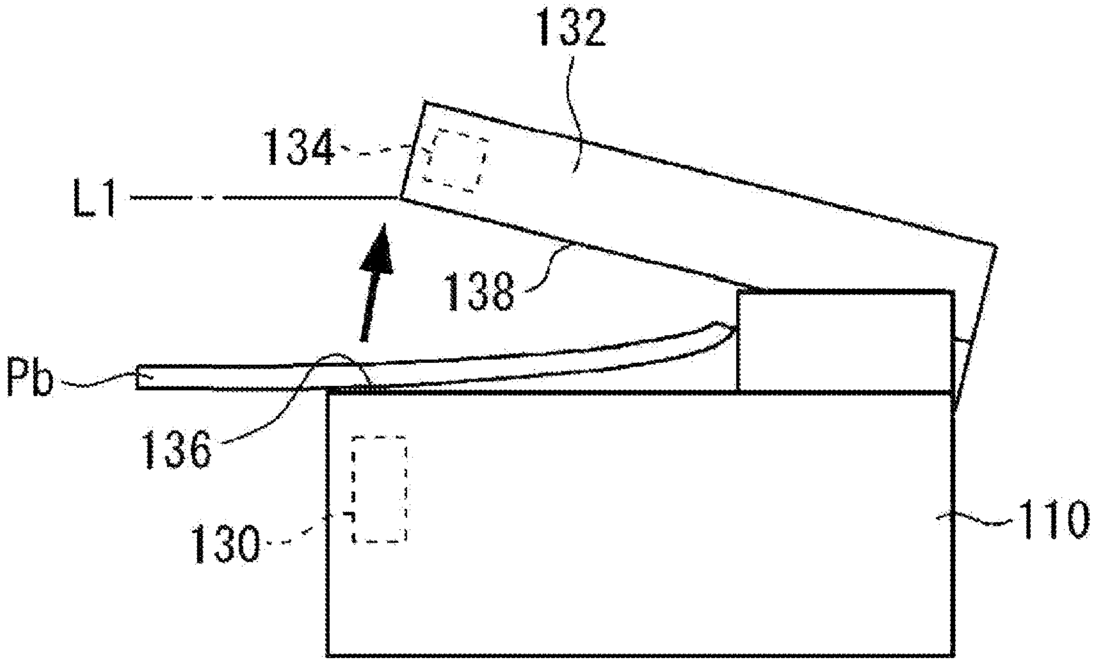
FIG. 4C is a schematic view showing the operation of the electric stapler in executing the first control mode according to the first embodiment.

Next, the first control model is described. FIG. 3 shows a sequence of the first control mode. In FIG. 3, the horizontal axis indicates a rotation angle of the gear 142. FIGS. 4A, 4B and 4C are schematic views showing an operation of the electric stapler 100A in executing the first control mode. Note that, in the below, a case where the binding processing is executed on a sheet bundle of three sheets and the clamping is executed for each sheet in the clamping process is described.

As shown in FIG. 3, when a first sheet is conveyed to the placement table 136 of the electric stapler 100A, a first clamping process is started in Sequence 1. In Sequence 1, forward rotation of the drive motor 154 causes the gear 142 to rotate from a start angle A0 to a clamping process end angle A1, so that the clamp part 138 moves from a first position L1 where the sheet P is not clamped to a second position L2 where the sheet P is clamped, as shown in FIGS. 4A and 4B. Thereby, the sheet P is pressed by the clamp part 138, and the curl of the sheet P is corrected.

In Sequence 2, reverse rotation of the drive motor 154 causes the gear 142 to reversely rotate and return from the clamping process end angle A1 to the start angle A0, so that the clamp part 138 returns from the second position L2 where the sheet P is clamped to the first position L1 where the sheet P is not clamped, as shown in FIG. 4C. Thereby, the first clamping ends, and a next sheet is ready to be accepted on the placement table 136.

Subsequently, when a second sheet is conveyed to the placement table 136 of the electric stapler 100A, a second clamping process is started in Sequence 3. In Sequence 3, the forward rotation of the drive motor 154 causes the gear 142 to rotate from the start angle A0 to the clamping process end angle A1, so that the clamp part 138 moves from the first position L1 where the sheet P is not clamped and to the second position L2 where the sheet P is clamped (refer to FIGS. 4A and 4B).

In Sequence 4, the reverse rotation of the drive motor 154 causes the gear 142 to return from the clamping process end angle A1 to the start angle A0, so that the clamp part 138 returns from the second position L2 where the sheet P is clamped to the first position L1 where the sheet P is not clamped (refer to FIG. 4C). Thereby, the second clamping ends, and a next sheet is ready to be accepted on the placement table 136.

Subsequently, when a third sheet is conveyed to the placement table 136 of the electric stapler 100A, the clamping process, the penetration process, the clinching process and the return process are continuously executed in Sequence 5. Specifically, the forward rotation of the drive motor 154 causes the gear 142 to rotate from the start angle A0 to the clamping process end angle A1, so that the clamp part 138 clamps the sheet bundle placed on the placement table 136.

Subsequently, the gear 142 rotates from the clamping process end angle A1 to a penetration process end angle A2, so that the penetration process is executed. In the penetrating process, the driver mechanism 130 rises, and the leg portions of the staple bent into a U-shape penetrate in a thickness direction of the sheet bundle.

Subsequently, the gear 142 rotates from the penetration process end angle A2 to a clinching process end angle A3, so that the clinching process is executed. In the clinching process, the clincher part 134 is driven, so that the clincher part 134 moves toward the leg portions of the staple penetrating through the sheet bundle and presses the leg portions. As a result, the leg portions of the staple are bent inwardly.

Subsequently, the gear 142 rotates from the clinching process end angle A3 to an end angle A4 (start angle A0), so that the return process is executed. In the return process, the clamp part 138 moves upward and returns to the home position, and the driver mechanism 130 moves downward and returns to the home position.

Note that, in the above-described example, the clamping process is controlled to be executed three times in total. However, the present invention is not limited thereto. For example, the clamping process may be executed twice, or may be executed four times or more.

[Sequence Example of Second Control Mode]

Figure 5:
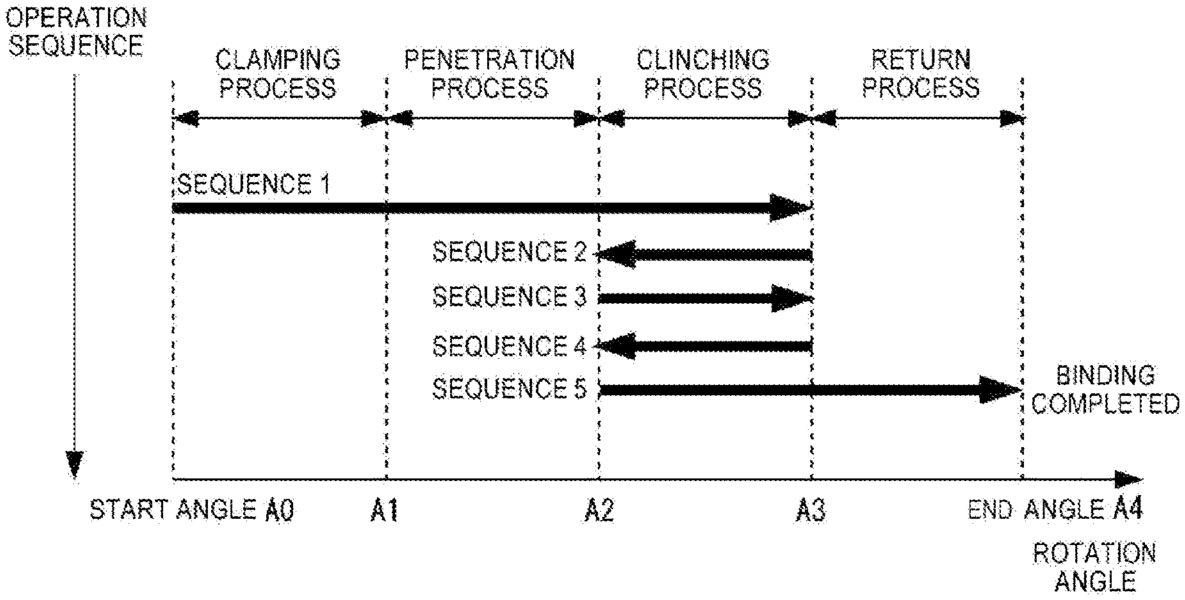
FIG. 5 is a sequence diagram of a second control mode according to the first embodiment.

Next, the second control model is described. FIG. 5 shows a sequence of the second control mode. FIGS. 6A, 6B, 6C, 6D and 6E are schematic views showing an operation of the electric stapler 100A in executing the second control mode. Note that, in the present embodiment, a case where the clinching process is executed three times is described.

As shown in FIG. 5, when a sheet bundle consisting of a predetermined number of sheets is placed on the placement table 136 of the electric stapler 100A, in Sequence 1, the clamping process, the penetration process, and the clinching process are continuously performed by the forward rotation of the drive motor 154. Specifically, the gear 142 rotates from the start angle A0 to the clamping process end angle A1, so that the clamping process is executed. In the clamping process, the clamp part 138 moves downward to clamp the sheet bundle.

Figure 6A:
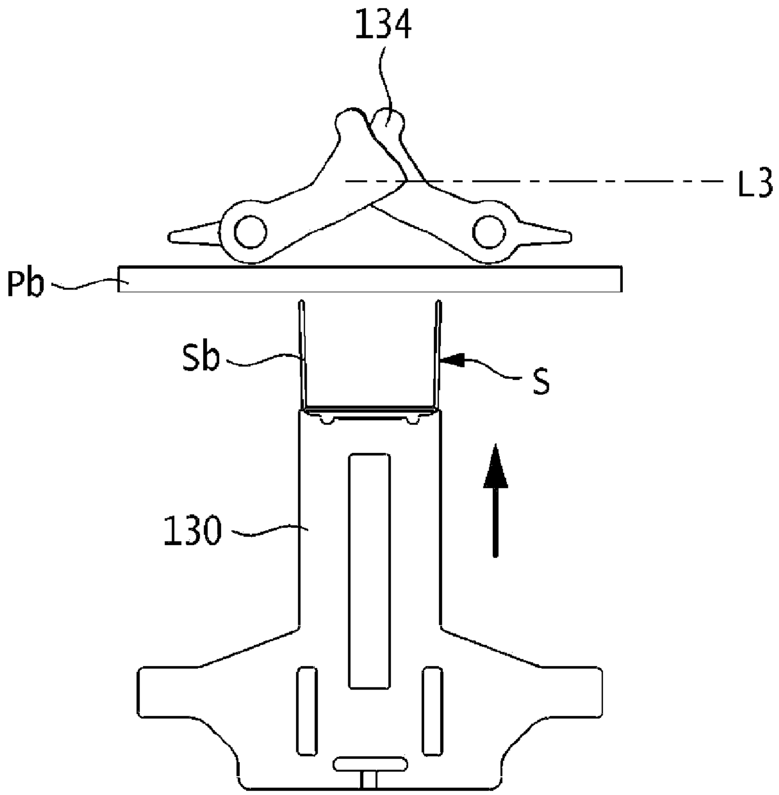
FIG. 6A is a schematic view showing an operation of the electric stapler in executing the second control mode according to the first embodiment.

Subsequently, the gear 142 rotates from the clamping process end angle A1 to the penetration process end angle A2, so that the penetration process is executed. In the penetration process, as shown in FIG. 6A, the driver mechanism 130 moves upward, so that the leg portions Sb of the staple S bent into a U-shape penetrate in the thickness direction of the sheet bundle Pb.

Figure 6B:
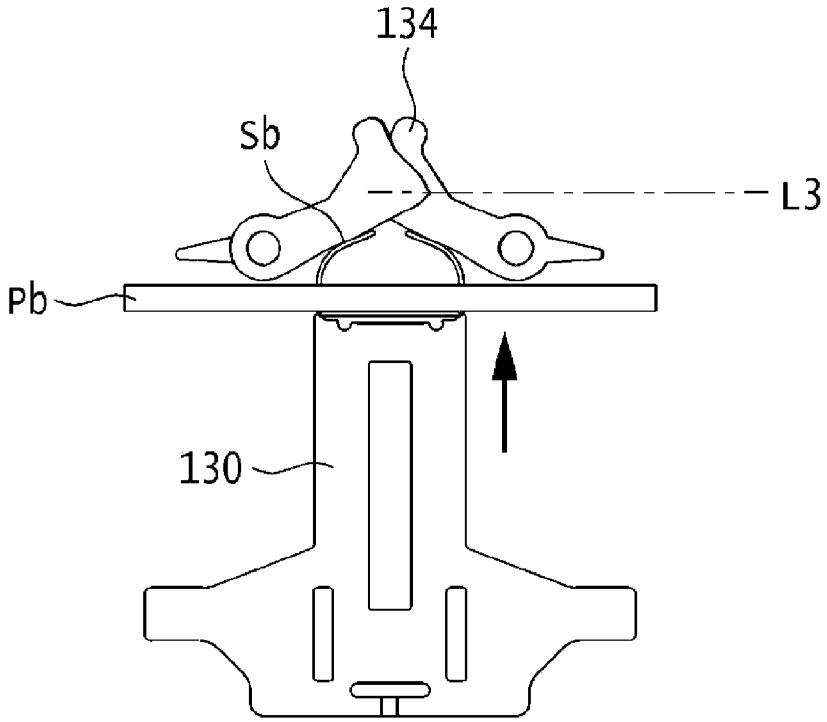
FIG. 6B is a schematic view showing the operation of the electric stapler in executing the second control mode according to the first embodiment.
Figure 6C:
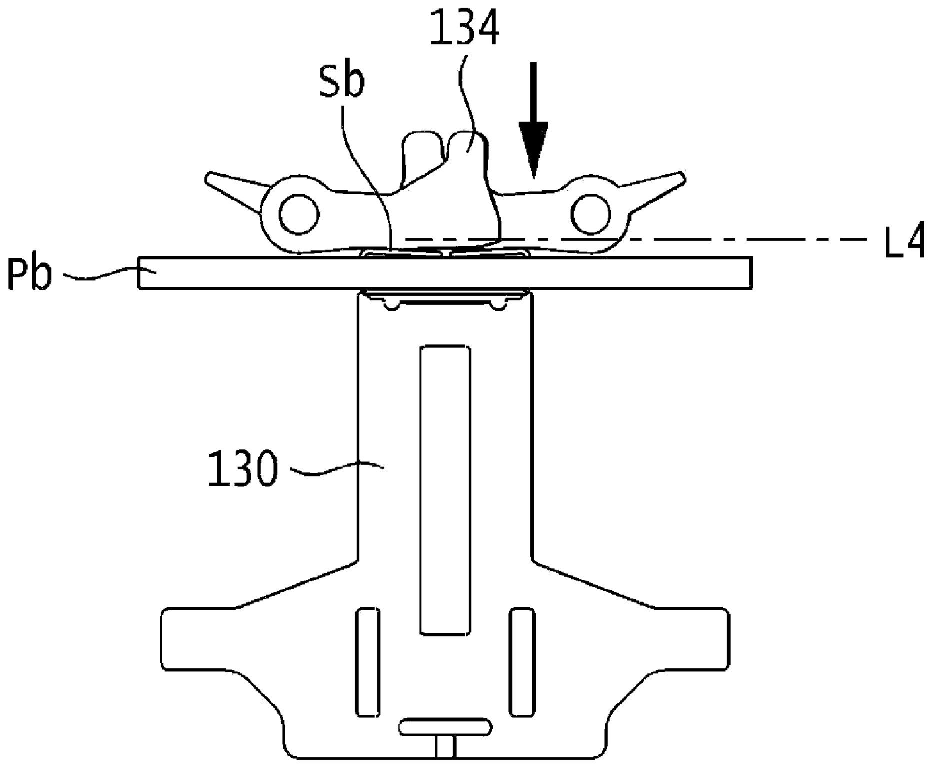
FIG. 6C is a schematic view showing the operation of the electric stapler in executing the second control mode according to the first embodiment.

Subsequently, the gear 142 rotates from the penetration process end angle A2 to the clinching process end angle A3, so that the clinching process is executed. In the clinching process, as shown in FIGS. 6B and 6C, the clincher part 134 moves from a third position L3 where the leg portions Sb of the staple S are not pressed to a fourth position L4 where the leg portions Sb are pressed. By the clinching by the clincher part 134, the leg portions Sb of the staple S penetrating through the sheet bundle Pb are pressed and bent inwardly.

Figure 6D:
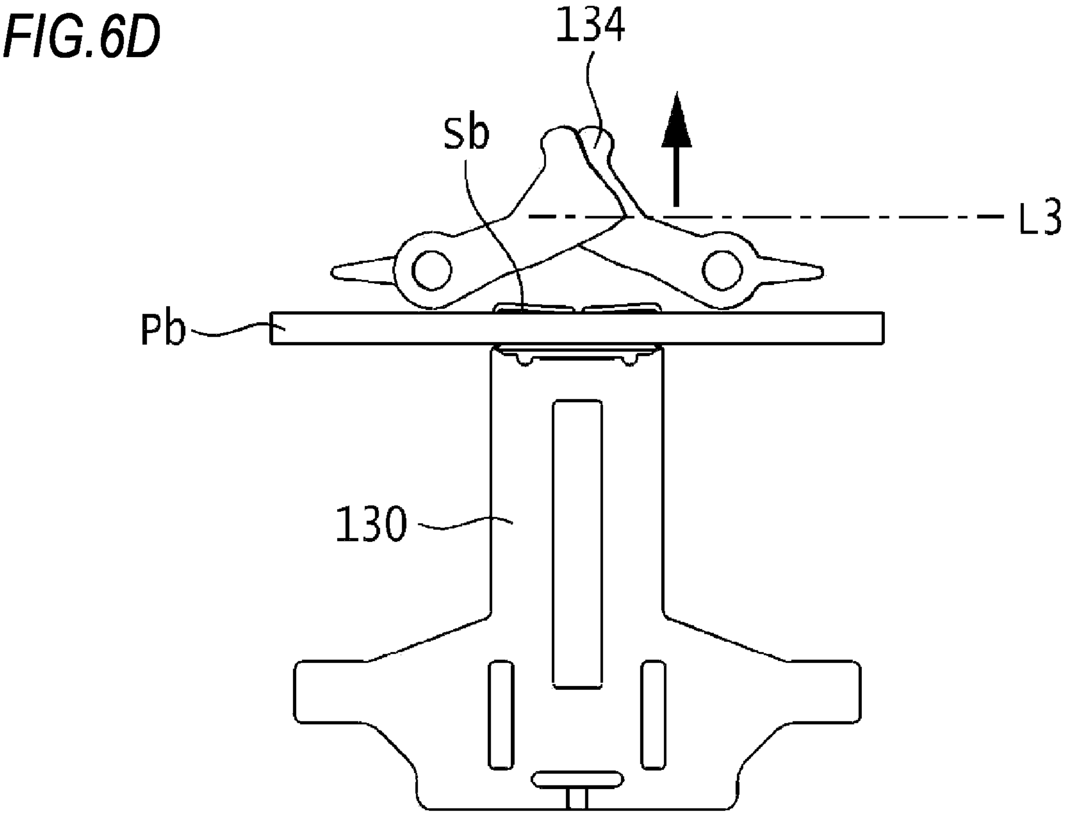
FIG. 6D is a schematic view showing the operation of the electric stapler in executing the second control mode according to the first embodiment.

In Sequence 2, the reverse rotation of the drive motor 154 causes the gear 142 to reversely rotate and return from the clinching process end angle A3 to the penetration process end angle A2, so that the clincher part 134 moves away from the leg portions Sb of the staple S and returns to the third position L3, as shown in FIG. 6D. Thereby, the pressed state of the leg portions Sb by the clincher part 134 is released.

Figure 6E:
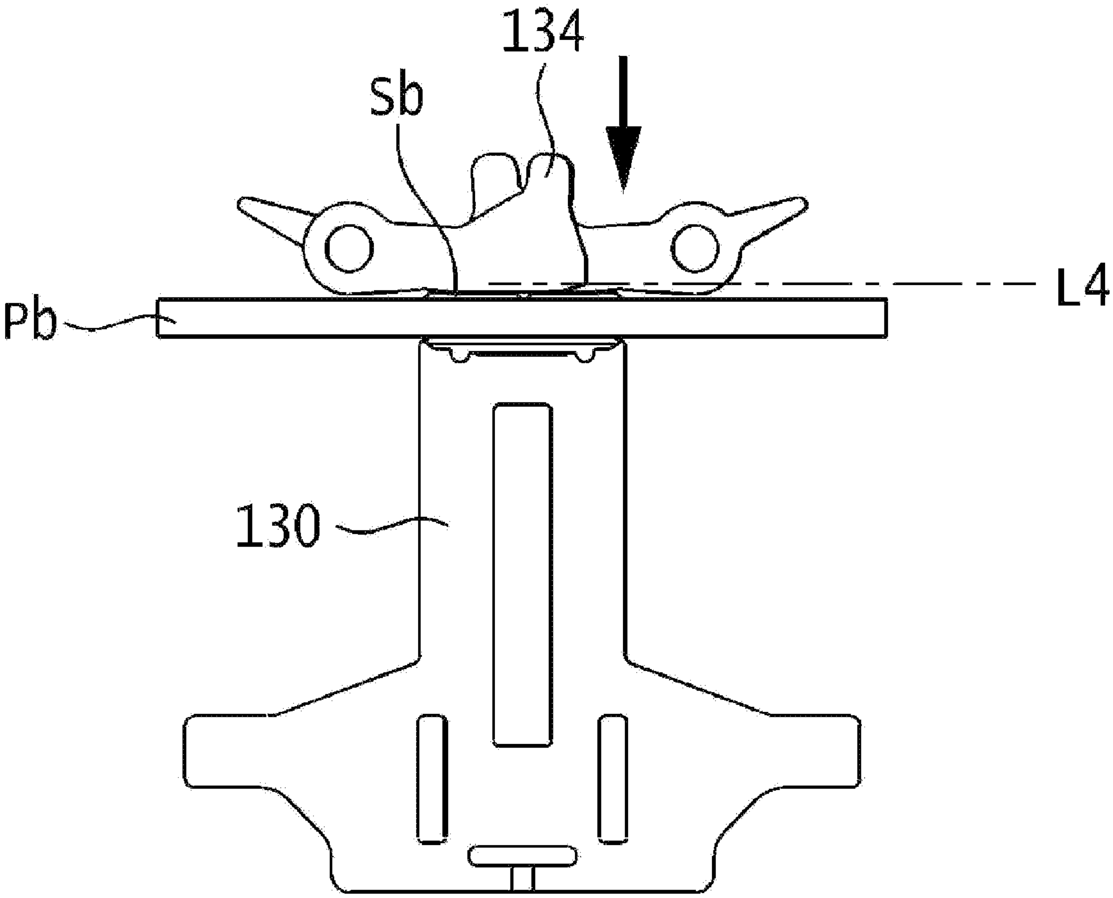
FIG. 6E is a schematic view showing the operation of the electric stapler in executing the second control mode according to the first embodiment.

In Sequence 3, the forward rotation of the drive motor 154 causes the gear 142 to rotate from the penetration process end angle A2 to the clinching process end angle A3, so that the clincher part 134 moves toward the leg portions Sb of the staple S and moves to the fourth position L4, as shown in FIG. 6E. Thereby, the leg portions Sb of the staple S are pressed again by the clincher part 134, so that an amount of floating of the leg portions Sb of the staple S with respect to the sheet bundle Pb is reduced and the staple S is formed flatter.

In Sequence 4, the reverse rotation of the drive motor 154 causes the gear 142 to reversely rotate and return from the clinching process end angle A3 to the penetration process end angle A2, so that the clincher part 134 moves away from the leg portions Sb of the staple S and returns to the third position L3 (refer to FIG. 6D). Thereby, the pressed state of the leg portions Sb by the clincher part 134 is released.

In Sequence 5, the forward rotation of the drive motor 154 causes the gear 142 to rotate from the penetration process end angle A2 to the end angle A4 (start angle A0), so that the return process is executed. In the clinching process, the clincher part 134 moves toward the leg portions Sb of the staple S, and moves to the fourth position L4. Thereby, the leg portions Sb of the staple S are pressed again, and the leg portions Sb are formed further flatter (refer to FIG. 6E). In the return process, the clamp part 138 moves upward and returns to the home position, and the driver mechanism 130 also moves downward and returns to the home position.

Note that, in the above-described example, the clinching process is controlled to be executed three times. However, the present invention is not limited thereto. For example, the clinching process may be executed twice, or may be executed four times or more. Further, in Sequence 2 and Sequence 4, in order to reliably press the leg portions Sb, the gear may be controlled to return to a rotation angle between the clamping process end angle A1 and the penetration process end angle A2.

[Operation Example of Electric Stapler 100A When Executing First Control Mode]

Figure 7A:
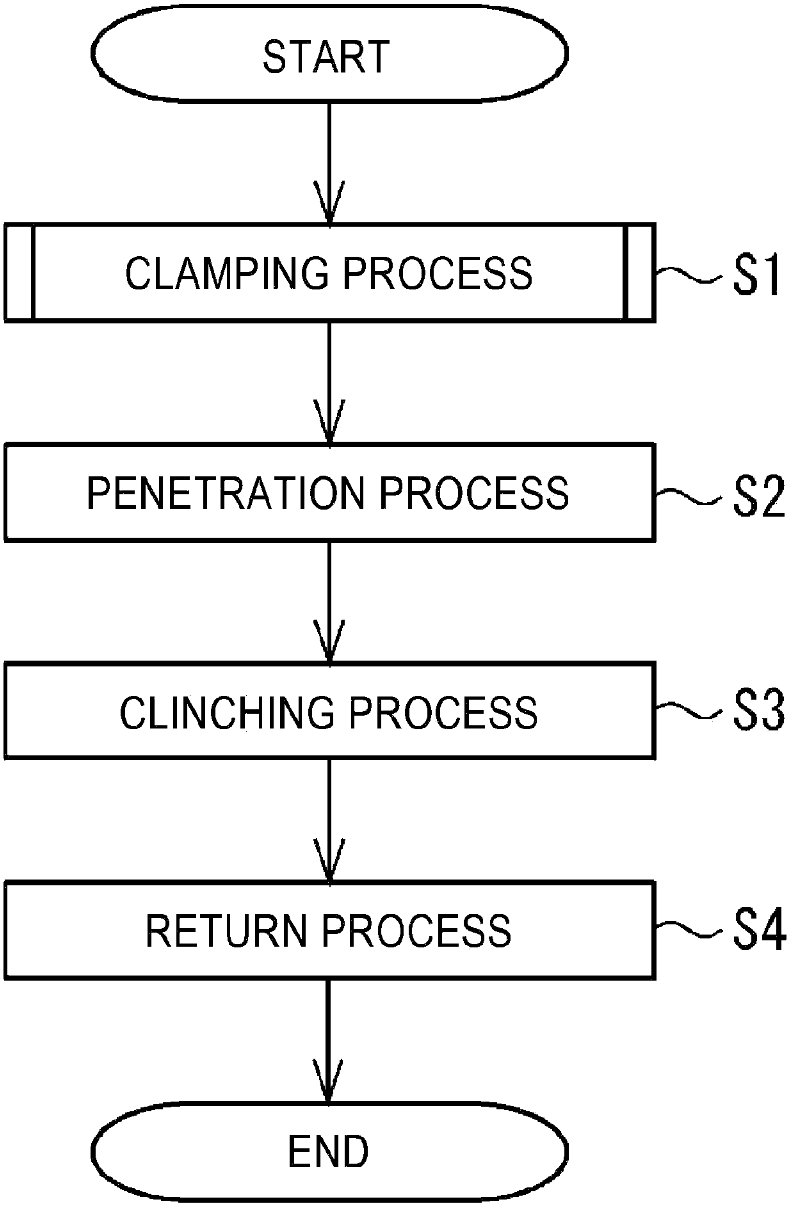
FIG. 7A is a flowchart showing the operation of the electric stapler when executing the first control mode according to the first embodiment.
Figure 7B:
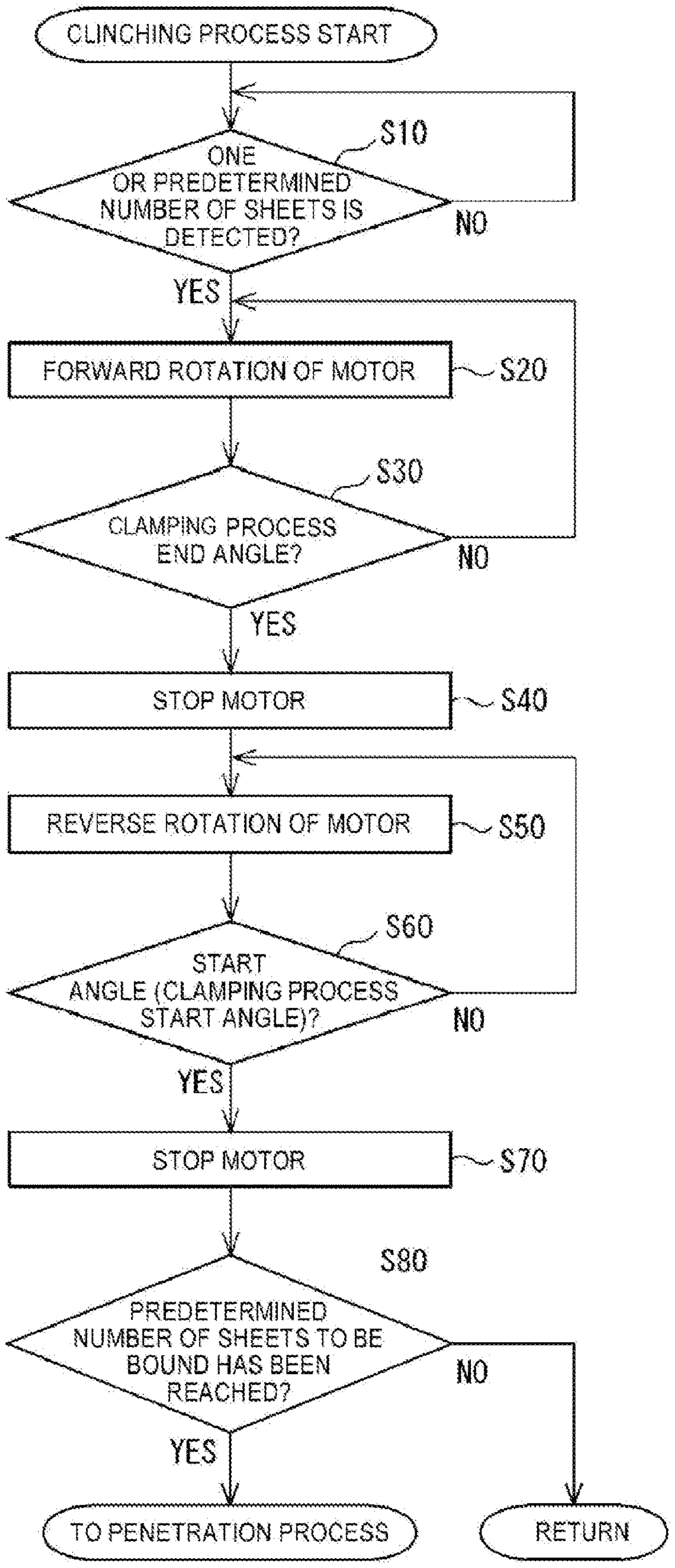
FIG. 7B is a flowchart showing a subroutine of a clamping process.

FIG. 7A is a flowchart showing an example of an operation of the electric stapler 100A when executing the first control mode, and FIG. 7B is a flowchart showing a subroutine of the clamping process in the first control mode.

When the control unit 150 of the electric stapler 100A receives a control signal including the parameter information on the first control mode from the control unit 250 of the sheet processing apparatus 200A, the control unit 150 starts the binding processing based on the first control mode. First, as shown in FIG. 7A, in step S1, the control unit 150 executes the clamping process. In the clamping process of the first control mode, the control unit proceeds to the subroutine shown in FIG. 7B.

As shown in FIG. 7B, in step S10, the control unit 150 determines, based on the sheet detection information supplied from the sheet detection unit 290, whether one sheet or a predetermined number of sheets P, which is a preset unit of the number of sheets for clamp, is placed on the placement table 136. Here, the predetermined number of sheets is two or more and less than the number of sheets to be bound. When a preset one sheet or a predetermined number of sheets P is placed on the placement table 136, the control unit proceeds to step S20.

In step S20, the control unit 150 controls the drive circuit 152 to rotate the drive motor 154 in the forward direction. When the drive motor 154 rotates in the forward direction, the gear 142 rotates in the forward direction with the start angle A0 as a start point, so that a clamping operation in the clamping process is started and the clamp part 138 moves toward the placement table 136. Thereby, the curl of the sheet P is pressed by the clamp part 138, so that the curl of the sheet P is corrected.

In step S30, the control unit 150 determines whether the gear 142 has rotated to the clamping process end angle A1. For example, the control unit 150 determines whether the gear 142 has rotated to the clamping process end angle A1 by counting an encoder signal indicating a rotation angle of the gear 142 or the like supplied from the position detection unit 160. When the gear 142 has not rotated to the clamping process end angle A1, the control unit 150 returns to step S20, and continues to rotate the gear 142 in the forward direction.

On the other hand, in step S30, when the control unit 150 determines that the gear 142 has rotated to the clamping process end angle A1, i.e., when the clamping operation has ended, the control unit proceeds to step S40. In step S40, the control unit stops the drive motor 154, and then in step S50, controls the drive circuit 152 to rotate the drive motor 154 in the reverse direction. The reverse rotation of the drive motor 154 causes the gear 142 to rotate in the reverse direction, so that the clamp part 138 moves away from the placement table 136.

In step S60, the control unit 150 determines whether the gear 142 has returned to the start angle A0. For example, the control unit 150 determines whether the gear 142 has returned to the start angle A0 by counting an encoder signal supplied from the position detection unit 160. When the gear 142 has not returned to the start angle A0, the control unit 150 returns to step S50, and continues to rotate the drive motor 154 in the reverse direction.

On the other hand, when the gear 142 has returned to the start angle A0, the control unit proceeds to step S70 and stops the drive motor 154. Thereby, the clamp part 138 returns to the first position L1 of the home position.

Subsequently, in step S80, the control unit 150 determines whether the number of sheets P conveyed to the placement table 136 has reached a preset number of sheets to be bound of the sheet bundle Pb. When the control unit 150 determines that the preset number of sheets to be bound of the sheet bundle Pb has not been reached, the control unit 150 returns to step S10 and repeatedly executes the processing of steps S10 to S80. Thereby, even when the sheet P is curled, the curl can be corrected and the sheet P can be made flatter by performing multiple times the clamping by the clamp part 138.

On the other hand, when the control unit 150 determines that the number of sheets P conveyed to the placement table 136 has reached the preset number of sheets to be bound of the sheet bundle Pb, the control unit 150 proceeds to the penetration process of step S2 of FIG. 7A.

Note that, it may be determined that the sheet P has been placed on the placement table 136 after a predetermined time, which is required after the sheet detecting unit 180 detects the sheet P on the conveying path until the sheet P is conveyed to the placement table 136, has elapsed.

In addition, in order to detect that the predetermined number of sheets has been placed on the placement table 136, it may be determined that the predetermined number of sheets P are placed on the placement table 136, based on the number of times of receiving the sheet detection signal supplied from the sheet detecting unit 290, and the clamping may be performed each time the predetermined number of sheets P is placed on the placement table 136.

Further, the control signal for proceeding to a next process may be generated based on, for example, the number of sheets of the sheet bundle to be bound, a unit of the number of sheets to be clamped, or the like. Further, for example, the process may proceed to a next process, based on a determination result as to whether a preset number of clamping designation times have ended.

As shown in FIG. 7A, in step S2, the control unit 150 executes the penetration process and causes the leg portions Sb of the staple S to penetrate through the sheet bundle Pb by driving the driver mechanism 130. Subsequently, in step S3, the control unit 150 executes the clinching process to bend inwardly the leg portions Sb of the staple S penetrating through the sheet bundle Pb by the clincher part 134. Finally, in step S4, the control unit 150 executes the return process to return the driver mechanism 130 and the clincher part 134 to the home positions. In this way, a series of binding processing based on the first control mode in which the clamping is performed multiple times is executed.

[Operation Example of Electric Stapler 100A When Executing Second Control Mode]

Figure 8A:
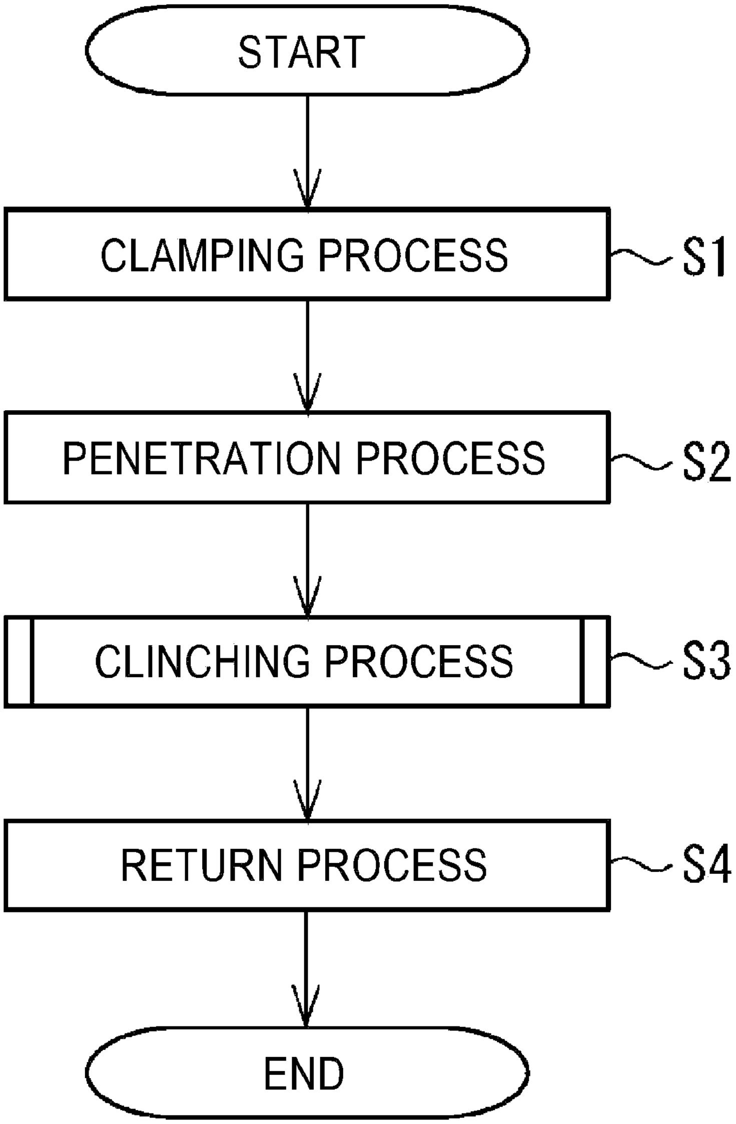
FIG. 8A is a flowchart showing the operation of the electric stapler when executing the second control mode according to the first embodiment.
Figure 8B:
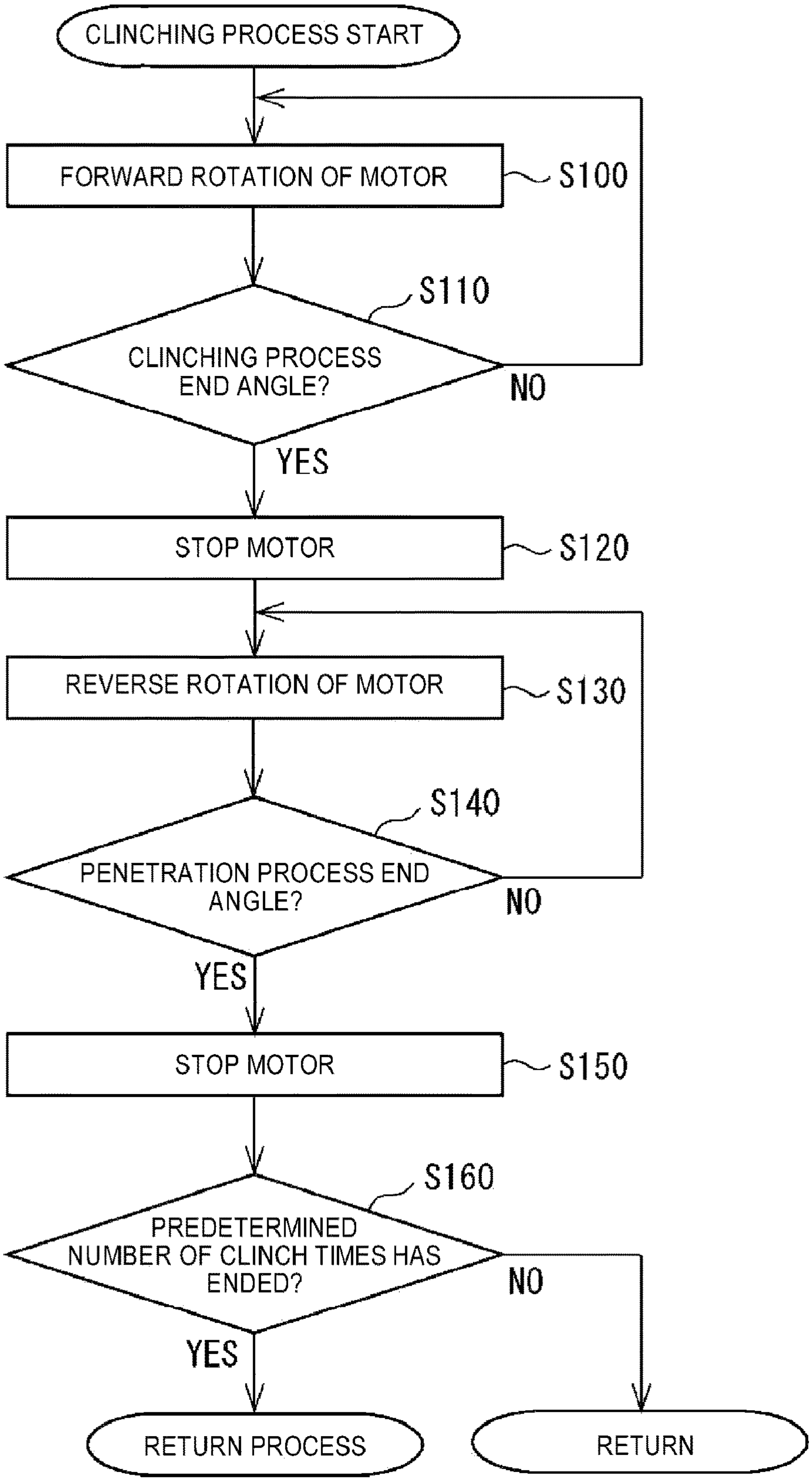
FIG. 8B is a flowchart showing a subroutine of a clinching process.

FIG. 8A is a flowchart showing an example of an operation of the electric stapler 100A when executing the second control mode, and FIG. 8B is a subroutine of the clinching process in the second control mode.

When the control unit 150 of the electric stapler 100A receives a control signal including the parameter information on the second control mode from the control unit 250 of the sheet processing apparatus 200A, the control unit 150 starts the binding processing based on the second control mode. Note that, it is assumed that the sheet bundle Pb is placed on the placement table 136 of the electric stapler 100A.

First, as shown in FIG. 8A, in step S1, the control unit 150 executes the clamping process, and sandwiches the sheet bundle Pb placed on the placement table 136 by the clamp part 138. Subsequently, in step S2, the control unit 150 executes the penetration process and causes the leg portions Sb of the staple S to penetrate through the sheet bundle Pb by driving the driver mechanism 130. Subsequently, in step S3, the control unit 150 executes the clinching process. In the clinching process of the second control mode, the control unit proceeds to the subroutine shown in FIG. 8B.

As shown in FIG. 8B, in step S100, the control unit 150 controls the drive circuit 152 to rotate the drive motor 154 in the forward direction. Thereby, the clincher part 134 is moved toward the leg portions S, so that the leg portions Sb of the staple S are pressed by the clincher part 134.

In step S11, the control unit 150 determines whether the gear 142 has rotated to the clinching process end angle A3. For example, the control unit 150 determines whether the gear 142 has rotated to the clinching process end angle A3 by counting an encoder signal supplied from the position detection unit 160. When the gear 142 has not rotated to the clinching process end angle A3, the control unit 150 returns to step S100, and continues to rotate the drive motor 154 in the forward direction.

On the other hand, in step S110, when the control unit 150 determines that the gear 142 has rotated to the clinching process end angle A3, i.e., when the clinching operation in the clinching process has ended, the control unit proceeds to step S120. In step S120, the control unit stops the drive motor 154, and then in step S130, controls the drive circuit 152 to rotate the drive motor 154 in the reverse direction. The reverse rotation of the drive motor 154 causes the gear 142 to rotate in the reverse direction, so that the clincher part 134 moves away from the leg portions Sb of the staple S.

In step S140, the control unit 150 determines whether the gear 142 has returned to the penetration process end angle A2. For example, the control unit 150 determines whether the gear 142 has returned to the penetration process end angle A2 by counting an encoder signal supplied from the position detection unit 160. When the gear 142 has not returned to the penetration process end angle A2, the control unit 150 returns to step S130, and continues to rotate the drive motor 154 in the reverse direction.

On the other hand, when the gear 142 has returned to the penetration process end angle A2, the control unit proceeds to step S150 and stops the drive motor 154. Thereby, the clincher part 134 returns to the third position L3 of the home position.

Subsequently, in step S160, the control unit 150 determines, for example, whether the preset number of clinching designation times has ended. When the control unit 150 determines that the preset number of clinching designation times has not ended, the control unit 150 returns to step S100 and repeatedly executes the processing of steps S100 to S160. Thereby, the clinching is performed multiple times by the clincher part 134, so that the leg portions Sb of the staple S can be made flatter.

On the other hand, when the control unit 150 determines, for example, that the preset number of clinching designation times has ended, the control unit 150 proceeds to the return process of step S4 of FIG. 8A. As shown in FIG. 8A, in step S4, the control unit 150 executes the return process to return the driver mechanism 130 and the clincher part 134 to the home positions. In this way, a series of binding processing based on the second control mode in which the clinching is performed multiple times is executed.

Note that, in the above-described embodiment, the example where the electric stapler 100A executes the first control mode and the second control mode independently has been described. However, the present invention is not limited thereto, and the first control mode and the second control mode may be combined. Specifically, in a series of binding processing, the clamping may be executed multiple times and then the clinching may be executed multiple times, or conversely, the clinching may be executed multiple times and then the clamping may be executed multiple times. In addition, the clamping process to the clinching process may be configured as one sequence, and this sequence may be executed multiple times. Note that, as for the determination as to whether the number of sheets to be bound has been reached, the determination method described in the first control mode may be adopted.

According to the first embodiment, since the sheet bundle Pb is clamped multiple times in the clamping process of the first control mode, the curl of the sheet P can be pressed by pressing and sandwiching by the clamp part 138. Thereby, the curl of the sheet P can be corrected, so that the sheet P can be made flatter. As a result, since the sheet bundle Pb is bound after the curl is corrected, it is possible to prevent the execution of the binding processing in a state where the end faces of the sheet bundle Pb are positionally misaligned or the end faces of the sheet bundle Pb are bent, so that the final binding appearance can be put in order. Further, since the curl of the sheet P can be corrected by the configuration on the electric stapler 100A-side, it is not necessary to separately provide a mechanism for correcting the curl of the sheet P in the sheet processing apparatus 200A, so that the cost can be reduced.

Further, according to the first embodiment, since the leg portions Sb are pressed multiple times by the clincher part 134 in the clinching process of the second control mode, an amount of floating of the leg portions Sb of the bent staple S with respect to the sheet bundle Pb can be reduced and the leg portions Sb can be made flatter, so that the binding appearance can be put in order. Thereby, the entire thickness of the sheet bundle can be reduced even when a plurality of bound sheet bundles Pb are stacked. As a result, it is possible to increase the loadable capacity when stacking and storing the sheet bundles Pb, and it is also possible to save a space when storing the sheet bundles Pb.

Second Embodiment

An electric stapler 100B according to a second embodiment does not include the control unit 150 and the drive circuit 152, and is configured to execute the binding processing, based on an instruction and control of the control unit 250 on a sheet processing apparatus 200B-side. Note that, the same components as those of the electric stapler 100A and the sheet processing apparatus 200A of the first embodiment are denoted with the same reference numerals, and the overlapping descriptions are omitted.

Figure 9:
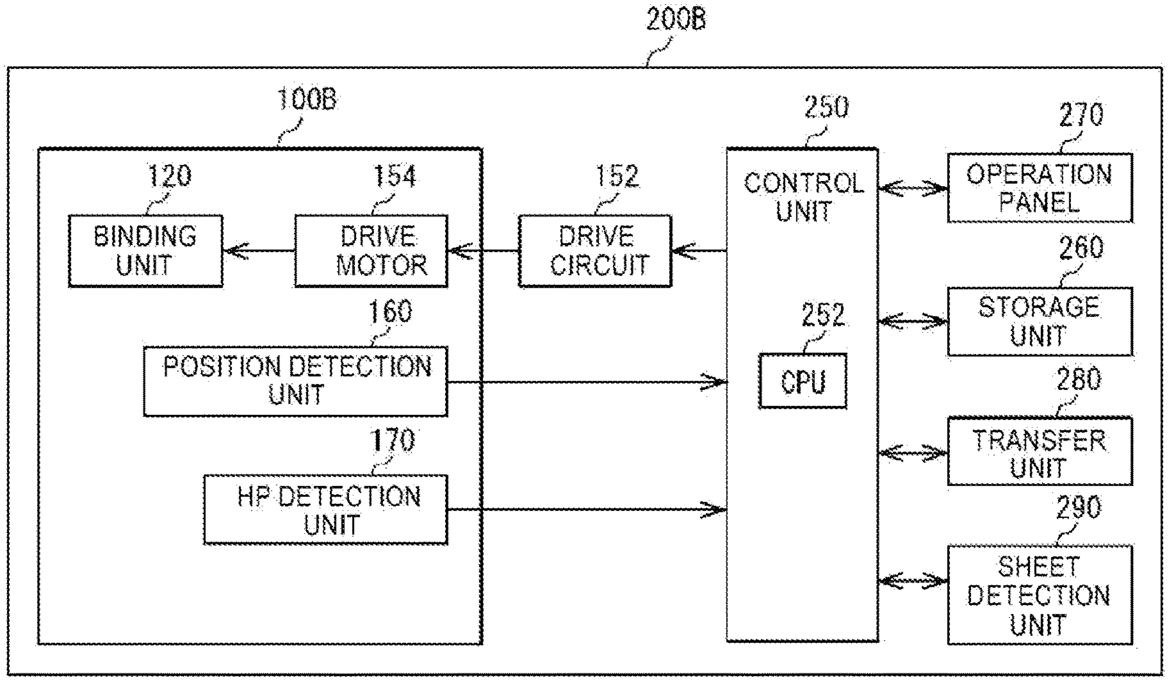
FIG. 9 is a block diagram of a sheet processing apparatus equipped with an electric stapler according to a second embodiment.

FIG. 9 is a block diagram of the sheet processing apparatus 200B equipped with the electric stapler 100B according to the second embodiment. As shown in FIG. 9, the sheet processing apparatus 200B is equipped with the electric stapler 100B configured to perform binding processing on the sheet bundle Pb, and has a control unit (controller) 250, a drive circuit 152, an operation panel 270, a storage unit 260, a transfer unit 280, and a sheet detection unit 290.

The electric stapler 100B has a drive motor 154, a binding unit 120, a position detection unit 160, an HP detection unit 170, and a sheet detection unit 290.

The drive motor 154 is connected to the drive circuit 152 on the sheet processing apparatus 200B-side via a wired or wireless interface, and is configured to rotationally drive based on predetermined power supplied from the drive circuit 152.

The binding unit 120 is configured to perform binding processing on a sheet bundle by sequentially executing a clamping process of clamping the sheet bundle Pb, a penetration process of penetrating a staple S through the clamped sheet bundle Pb, a clinching process of pressing leg portions Sb of the staple S penetrating through the sheet bundle Pb, and a return process of returning each part to a home position, based on the rotary drive of the drive motor 154.

The position detection unit 160 is connected to the control unit 250 and is configured to output pulsed encoders signals indicating rotation angles of the gear 142 and the drive motor 154 to the control unit 250. The HP detection unit 170 is connected to the control unit 250 and is configured to output a position signal indicating the home position of the gear 142 to the control unit 250. The sheet detection unit 290 is provided between the transfer unit 280 of the sheet processing apparatus 200B and the electric stapler 100B, is connected to the control unit 250, and is configured to detect the sheet P, which is conveyed from the transfer unit 280 to the placement table 136 of the electric stapler 100B, and to output a detection signal to the control unit 250.

The control unit 250 provided on the sheet processing apparatus 200B-side is configured to control the drive motor 154, based on various parameters relating to binding processing input by the operation panel 270 and the like and an encoder signal supplied from the position detection unit 160. Specifically, the control unit 250 is configured to control the drive motor 154 to execute at least one control mode of a first control mode in which the sheet bundle Pb is clamped multiple times in the clamping process and a second control mode in which the leg portions Sb of the staple S are pressed multiple times in the clinching process.

In the first control mode, in the clamping process, the control unit 250 is configured to rotate the drive motor 154 in the forward direction to a position where the sheet bundle Pb is clamped, and then to rotate the drive motor 154 in the reverse direction to a position where the sheet bundle Pb is unclamped. Further, in the clamping process in the first control mode, the control unit 250 may be configured to control the drive motor 154 to execute the clamping on the sheet bundle Pb each time the sheet P is conveyed one by one or the sheet P is conveyed in a unit of a predetermined number of sheets onto the placement table 136 of the electric stapler 100B.

According to the second embodiment, the operational effects similar to those of the first embodiment can be obtained. Specifically, since the sheet bundle Pb is clamped multiple times in the clamping process of the first control mode, the curl of the sheet P can be corrected and the sheet P can be therefore made flatter. As a result, since the sheet bundle Pb is bound after the curl is corrected, it is possible to prevent the execution of the binding processing in a state where the end faces of the sheet bundle Pb are positionally misaligned or the end faces of the sheet bundle Pb are bent, so that the final binding appearance can be put in order. Further, since the leg portions Sb are pressed multiple times by the clincher part 134 in the clinching process of the second control mode, an amount of floating of the leg portions Sb of the bent staple S with respect to the sheet bundle Pb can be reduced and the leg portions Sb can be made flatter, so that the binding appearance can be put in order.

Third Embodiment

An electric stapler 100C according to a third embodiment does not include the control unit 150, and is configured to execute the binding processing, based on control of the control unit 250 on a sheet processing apparatus 200C-side. Note that, the same components as those of the electric stapler 100A and the sheet processing apparatus 200A of the first embodiment are denoted with the same reference numerals, and the overlapping descriptions are omitted.

Figure 10:
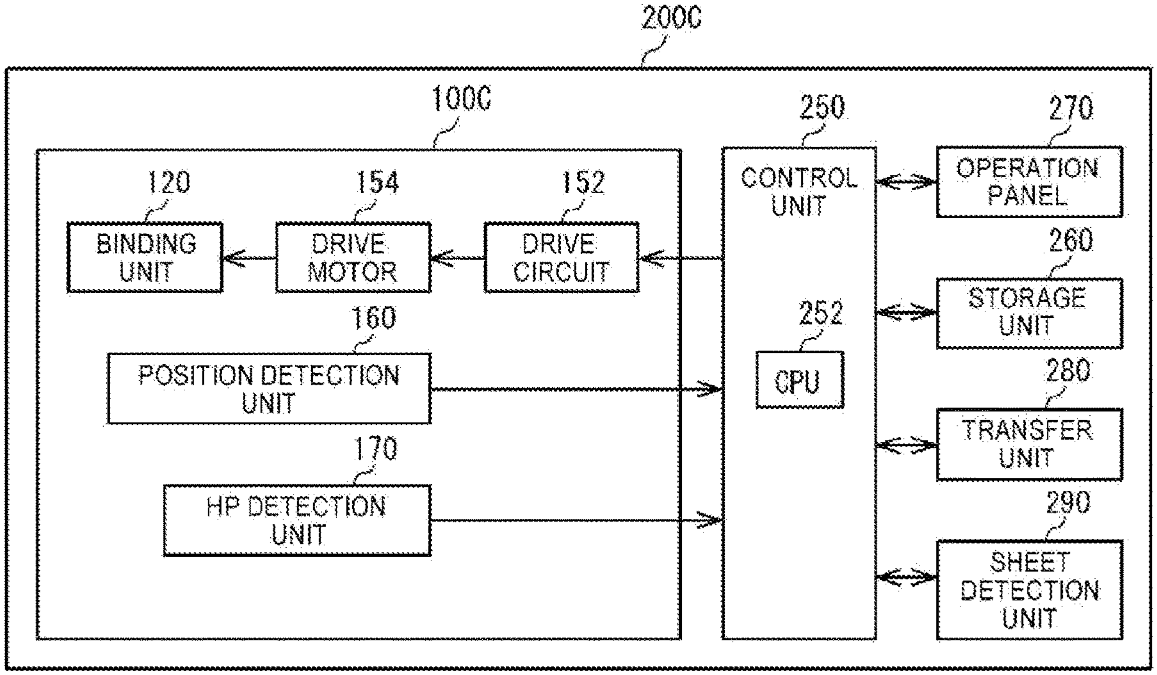
FIG. 10 is a block diagram of a sheet processing apparatus equipped with an electric stapler according to a third embodiment.
Figure 11:
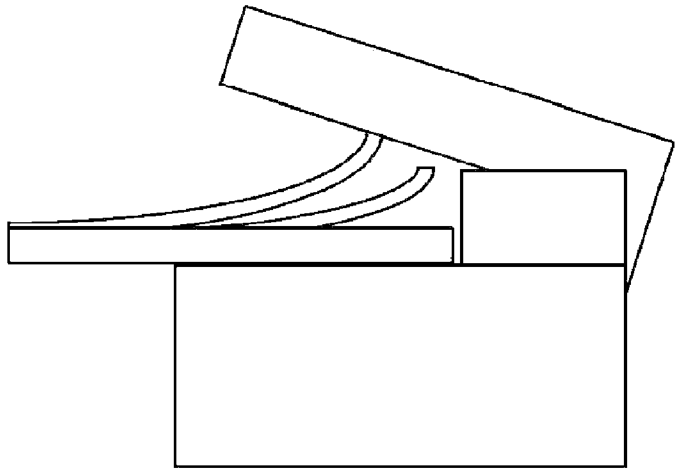
FIG. 11 illustrates a problem caused due to a curled sheet, in an electric stapler of the related art.
Figure 12:
FIG. 12 illustrates a problem caused due to a thickness of a staple portion of a booklet bound with the electric stapler of the related art.

FIG. 10 is a block diagram of the sheet processing apparatus 200C equipped with an electric stapler 100C according to the third embodiment. The sheet processing apparatus 200C is equipped with the electric stapler 100C configured to perform binding processing on a sheet bundle, and includes a control unit (controller) 250, an operation panel 270, a storage unit 260, and a transfer unit 280.

The electric stapler 100C has a drive circuit 152, a drive motor 154, a binding unit 120, a position detection unit 160, and an HP detection unit 170.

The drive circuit 152 is connected to the control unit 250 on the sheet processing apparatus 200C-side via a wired or wireless interface, and is configured to perform switching control, based on a control signal relating to binding processing supplied from the control unit 250, and to supply predetermined power to the drive motor 154. The drive motor 154 is configured to rotationally drive based on the predetermined power supplied from the drive circuit 152.

The binding unit 120 is configured to perform binding processing on a sheet bundle Pb by sequentially executing a clamping process of clamping the sheet bundle Pb, a penetration process of penetrating a staple S through the clamped sheet bundle Pb, a clinching process of pressing leg portions Sb of the staple S penetrating through the sheet bundle Pb, and a return process of returning each part to a home position, based on the rotary drive of the drive motor 154.

The position detection unit 160 is connected to the control unit 250 and is configured to output a pulsed encoder signal indicating a rotation angle of the drive motor 154 to the control unit 250. The HP detection unit 170 is connected to the control unit 250 and is configured to output a position signal indicating the home position of the gear 142 to the control unit 250. The sheet detection unit 290 is provided between the transfer unit 280 of the sheet processing apparatus 200C and the electric stapler 100C, is connected to the control unit 250, and is configured to detect the sheet P, which is conveyed from the transfer unit 280 to the placement table 136 of the electric stapler 100C, and to output a detection signal to the control unit 250.

The control unit 250 provided on the sheet processing apparatus 200C-side is configured to control the drive motor 154, based on various parameters relating to binding processing input by the operation panel 270 and an encoder signal supplied from the position detection unit 160. Specifically, the control unit 250 is configured to set (select) at least one control mode of a first control mode in which the sheet bundle Pb is clamped multiple times in the clamping process and a second control mode in which the leg portions Sb of the staple S are pressed multiple times in the clinching process, and control the drive motor 154 to execute the set control mode.

In the first control mode, in the clamping process, the control unit 250 is configured to rotate the drive motor 154 in the forward direction to a position where the sheet bundle Pb is clamped, and then to rotate the drive motor 154 in the reverse direction to a position where the sheet bundle Pb is unclamped. Further, in the clamping process in the first control mode, the control unit 250 may be configured to control the drive motor 154 to execute the clamping on the sheet bundle Pb each time the sheet P is conveyed one by one or the sheet P is conveyed in a unit of a predetermined number of sheets onto the placement table 136 of the electric stapler 100C.

According to the third embodiment, the operational effects similar to those of the first embodiment can be obtained. Specifically, since the sheet bundle Pb is clamped multiple times in the clamping process of the first control mode, the curl of the sheet P can be corrected and the sheet P can be therefore made flatter. As a result, since the sheet bundle is bound after the curl is corrected, it is possible to prevent the execution of the binding processing in a state where the end faces of the sheet bundle Pb are positionally misaligned or the end faces of the sheet bundle Pb are bent, so that the final binding appearance can be put in order. Further, since the leg portions Sb are pressed multiple times by the clincher part 134 in the clinching process of the second control mode, an amount of floating of the leg portions Sb of the bent staple S with respect to the sheet bundle Pb can be reduced and the leg portions Sb can be made flatter, so that the binding appearance can be put in order.

Although the embodiments of the present disclosure have been described in detail with reference to the drawings, the specific configuration is not limited to the present embodiments, and includes designs and the like within a range that does not deviate from the gist of the present disclosure. Further, the effects described in the present specification are merely exemplary and not limited, and other effects may also be obtained.

In the above-described embodiments, the example where the electric stapler 100A or the like is mounted inside the sheet processing apparatus 200A or the like has been described. However, the present invention is not limited thereto. For example, the electric stapler 100A or the like may be a desktop type that can independently perform the binding processing.

In addition, in the above-described embodiments, the example where the electric stapler 100A or the like is mounted inside the sheet processing apparatus 200A or the like functioning as an image forming apparatus has been described. However, the present invention is not limited to such configuration. For example, the electric stapler 100A; 100B; 100C described above may be mounted inside a post-processing apparatus (sheet processing apparatus) connected to a downstream side of the sheet processing apparatus 200A. In this case, the electric stapler 100A or the like may be configured to perform the binding processing, based on an instruction from the control unit 250 of the sheet processing apparatus 200A, or to execute the binding processing, based on an instruction supplied from the control unit 250 of the sheet processing apparatus 200A via a control unit provided in the post-processing apparatus.

Further, the selection of the first control mode, the second control mode, the normal binding processing mode, and the like may be automatically determined by the control unit 250 of the sheet processing apparatus 200A or the like or the control unit 150 of the electric stapler 100A, based on at least one of a sheet type, a number of sheets to be bound, a current value of the drive motor 154, a binding processing time, a temperature of a use environment, and the like.

Further, the numerical values of the parameters relating to the first control mode and the second control mode may be calculated based on the detection information from the other sensors with the input information from the operation panel 270 as a basis, and may be re-recorded so that the optimum binding processing can be executed.

In addition, as for the second control mode, the number of times that the clinching is executed may be automatically calculated based on the current value of the drive motor 154 at the time of clinch. Further, the control unit 150 of the electric stapler 100A may be configured to calculate the number of clinching times in the second control mode, based on at least one of the number of sheets to be bound and the sheet information supplied from the sheet processing apparatus 200A or the post-processing apparatus.

EXPLANATION OF REFERENCE

100A, 100B, 100C: electric stapler
120: binding unit
134: clincher part
138: clamp part
150: control unit
154: drive motor
200A, 200B, 200C: sheet processing apparatus
250: control unit
P: sheet
Pb: sheet bundle
S: staple
Sb: leg portion

What is claimed is:

1. An electric stapler comprising:

a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle;

a motor configured to drive the binding unit; and a controller configured to control the motor, wherein the controller is configured to control the motor to execute the clamping on the sheet bundle multiple times in the clamping process, wherein the binding unit has a clamp part configured to clamp the sheet bundle in the clamping process, and is configured such that the clamping process, the penetration process and the clinching process are sequentially executed as the motor rotates in a forward direction, wherein the clamp part is configured to be movable between a first position where the sheet bundle is not clamped and a second position where the sheet bundle is clamped, and when the motor rotates in the forward direction in the clamping process, the clamp part moves from the first position to the second position and when the motor rotates in a reverse direction in the clamping process, the clamp part moves from the second position to the first position, and wherein the controller is configured to control the motor to repeat the forward rotation and reverse rotation of the motor multiple times in the clamping process.

2. The electric stapler according to claim 1, further comprising:

a placement table on which the sheet bundle is mounted, and wherein the binding unit includes:

a driver mechanism configured to be movable toward the placement table to strike out the staple toward the sheet bundle; and a clincher arm arranged to face the drive mechanism.

3. The electric stapler according to claim 1, wherein the controller is configured to control the motor to execute the pressing on the leg portions multiple times in the clinching process.

4. The electric stapler according to claim 1, wherein the controller is configured to control the motor to execute the clamping on the sheet bundle each time a sheet is conveyed one by one, in the clamping process.

5. The electric stapler according to claim 1, wherein the controller is configured to control the motor to execute the clamping on the sheet bundle each time a predetermined number of sheets is conveyed, in the clamping process.

6. An electric stapler comprising:

a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle;

a motor configured to drive the binding unit; and a controller configured to control the motor, wherein the controller is configured to control the motor to execute the pressing on the leg portions multiple times in the clinching process, wherein the binding unit has a clincher part configured to press the leg portions of the staple in the clinching process, and is configured such that the clamping process, the penetration process and the clinching process are sequentially executed as the motor rotates in a forward direction, wherein the clincher part is configured to be movable between a third position where the leg portions are not pressed and a fourth position where the leg portions are pressed, and when the motor rotates in the forward direction in the clinching process, the clincher part moves from the third position to the fourth position and when the motor rotates in a reverse direction in the clinching process, the clincher part moves from the fourth position to the third position, and wherein the controller is configured to control the motor to repeat the forward rotation and reverse rotation of the motor multiple times in the clinching process.

7. A sheet processing apparatus capable of being equipped with an electric stapler comprising a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, and a motor configured to drive the binding unit, the sheet processing apparatus comprising:

a controller configured to control the motor when the electric stapler is equipped, wherein the controller is configured to control the motor to execute the clamping on the sheet bundle multiple times in the clamping process, and wherein when the electric stapler, which is configured to clamp the sheet bundle when the motor rotates in a forward direction and not to clamp the sheet bundle when the motor rotates in a reverse direction in the clamping process, is equipped, the controller is configured to control the motor to repeat the forward rotation and reverse rotation of the motor multiple times in the clamping process.

8. The sheet processing apparatus according to claim 7, wherein the controller is configured to control the motor to execute the pressing on the leg portions multiple times in the clinching process.

9. The sheet processing apparatus according to claim 7, wherein the controller is configured to control the motor to execute the clamping on the sheet bundle each time a sheet is conveyed one by one, in the clamping process.

10. The sheet processing apparatus according to claim 7, wherein the controller is configured to control the motor to execute the clamping on the sheet bundle each time a predetermined number of sheets is conveyed, in the clamping process.

11. A sheet processing apparatus capable of being equipped with an electric stapler comprising a binding unit configured to perform binding processing on a sheet bundle by sequentially executing a clamping process of clamping the sheet bundle, a penetration process of penetrating a staple through the clamped sheet bundle, and a clinching process of pressing leg portions of the staple penetrating through the sheet bundle, and a motor configured to drive the binding unit, the sheet processing apparatus comprising:

a controller configured to control the motor when the electric stapler is equipped, wherein the controller is configured to control the motor to execute the pressing on the leg portions multiple times in the clinching process, wherein the binding unit has a clincher part configured to press the leg portions of the staple in the clinching process, and is configured such that the clamping process, the penetration process and the clinching process are sequentially executed as the motor rotates in a forward direction, wherein the clincher part is configured to be movable between a third position where the leg portions are not pressed and a fourth position where the leg portions are pressed, and when the motor rotates in the forward direction in the clinching process, the clincher part moves from the third position to the fourth position and when the motor rotates in a reverse direction in the clinching process, the clincher part moves from the fourth position to the third position, and wherein the controller is configured to control the motor to repeat the forward rotation and reverse rotation of the motor multiple times in the clinching process.

* * * * *